United States Patent
Son

(10) Patent No.: US 9,509,161 B2
(45) Date of Patent: Nov. 29, 2016

(54) BATTERY-CHARGING APPARATUS AND METHOD OF ELECTRONIC DEVICE

(71) Applicant: Samsung Electronics Co., Ltd., Suwon-si, Gyeonggi-do (KR)

(72) Inventor: Woonsang Son, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 144 days.

(21) Appl. No.: 14/531,215

(22) Filed: Nov. 3, 2014

(65) Prior Publication Data

US 2015/0123597 A1    May 7, 2015

(30) Foreign Application Priority Data

Nov. 4, 2013 (KR) .......................... 10-2013-0132973

(51) Int. Cl.
*H02J 7/00* (2006.01)
*G06F 1/32* (2006.01)

(52) U.S. Cl.
CPC ............. *H02J 7/007* (2013.01); *G06F 1/3234* (2013.01); *H02J 7/0068* (2013.01)

(58) Field of Classification Search
CPC ................................ H02J 7/007; H02J 7/0068
USPC ........................................................ 320/107
See application file for complete search history.

(56) References Cited

U.S. PATENT DOCUMENTS

| | | | | |
|---|---|---|---|---|
| 7,741,812 B2 * | 6/2010 | Ukon | ............... | G01R 19/16542 320/132 |
| 8,287,514 B2 * | 10/2012 | Miller | ................. | A61M 5/1413 417/18 |
| 8,860,373 B2 * | 10/2014 | Saito | ..................... | H02J 7/0031 320/129 |
| 2010/0246857 A1 | 9/2010 | Kajita | | |
| 2012/0068978 A1 | 3/2012 | Aitken et al. | | |
| 2012/0159220 A1 | 6/2012 | Winkler et al. | | |
| 2013/0111241 A1 | 5/2013 | Ha et al. | | |
| 2014/0245036 A1 | 8/2014 | Oishi | | |

FOREIGN PATENT DOCUMENTS

| | | |
|---|---|---|
| EP | 1895393 A1 | 3/2008 |
| JP | 2002237971 | 8/2002 |
| JP | 2008104351 | 5/2008 |
| KR | 10-2012-0030989 A | 3/2012 |
| KR | 10-2013-0045725 A | 5/2013 |
| WO | 2009041717 A1 | 4/2009 |
| WO | 2013073267 A1 | 5/2013 |

* cited by examiner

*Primary Examiner* — Sun Lin
(74) *Attorney, Agent, or Firm* — Jefferson IP Law, LLP

(57) ABSTRACT

A charging apparatus and a method for a battery-powered electronic device are provided. The charging method includes detecting a connection of a charger, checking a charging power and a discharging power of a battery while charging the battery with an output of the charger, determining whether the electronic device is in a normal charging state according to a difference between the charging and discharging powers, restricting, when the electronic device is in an abnormal charging state, supply of operation power from the battery, and supplying, when the electronic device is in the normal charging state, the operation power from the battery.

20 Claims, 5 Drawing Sheets

BATTERY-CHARGING APPARATUS AND METHOD OF ELECTRONIC DEVICE

CROSS REFERENCE TO RELATED APPLICATION(S)

This application claims the benefit under 35 U.S.C. §119(a) of a Korean patent application filed on Nov. 4, 2013 in the Korean Intellectual Property Office and assigned Serial number 10-2013-0132973, the entire disclosure of which is hereby incorporated by reference.

TECHNICAL FIELD

The present disclosure relates to a charging apparatus and method of an electronic device powered by a battery.

BACKGROUND

A battery-powered electronic device controls a power supply in various manners to conserve battery power. For example, the electronic device may be configured to enter a Power Saving Mode to minimize discharge current when a residual capacity of the battery becomes equal to or less than a predetermined threshold. In the Power Saving Mode, the electronic device may adjust the Central Processing Unit (CPU) clock and/or a number of active cores to control power consumption.

The related art electronic device uses a method of controlling power in active mode. Recently, as the functions of the electronic device have become increasingly diversified, the extended CPU capability and display size have increased the power consumption of the electronic device. A user may charge the electronic device during use to avoid battery drainage.

In the state of charging the battery, the electronic device consumes as much power as required. For example, in the case of an application requiring large power consumption, such as navigator, video playback, and game applications, the discharging power may become equal to or greater than the power being charged into the battery.

In order to solve this problem, the present disclosure provides a battery charging control apparatus and method which are capable of measuring charged power capacity in stepwise manner and, when the charging state of battery is abnormal, controlling the power supply for use of the electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a charging apparatus and method of an electronic device powered by a battery.

In accordance with an aspect of the present disclosure, a charging method of an electronic device is provided. The charging method includes detecting a connection of a charger, checking a charging power and a discharging power of a battery while charging the battery with an output of the charger, determining whether the electronic device is in a normal charging state according to a difference between the charging and discharging powers, restricting, when the electronic device is in an abnormal charging state, a supply of operation power from the battery, and supplying, when the electronic device is in the normal charging state, the operation power from the battery.

In accordance with another aspect of the present disclosure, a charging method of an electronic device is provided. The charging method includes charging, when a charger is connected, a battery with output of the charger, checking, when the connected charger includes one of Universal Serial Bus (USB), cigar jack, and wireless types chargers, a charging power and a discharging power of the battery, calculating a difference between the charging and discharging powers, determining whether the electronic device is in the abnormal charging state according to the difference, checking, when the electronic device is in the abnormal charging state, residual capacity of the battery, restricting, when the residual capacity of the battery is equal to or less than a threshold value, a supply of operation power from the battery, and supplying, when the electronic device is in the abnormal charging state, the restricted operation power from the battery.

In accordance with still another aspect of the present disclosure, an electronic device is provided. The electronic device includes a battery, a connector to which a charger is connected, a charging unit configured to generate a charging power to the battery when the charger is connected to the connector, a power unit configured to supply power of the battery as operation power, a connection detection unit configured to detect a connection of the charger to the connector, a charging detection unit configured to check a charging power and a discharging power of the battery, and a control unit configured to control the charging unit and power unit to adjust charging and discharging powers of the battery in detection of the connection of the charger, to analyze a charging state of the battery according to a difference between the charging and discharging powers, and to control, when the battery is in an abnormal charging state, the power unit to restrict the supply of the operation power.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, description of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

When charging the battery of a battery-power electronic device, the battery charging apparatus and method monitor the charging power and discharging power to regulate the charging current to the battery. In order to accomplish this, if the charged power does not increase in the state that the charger is connected to the power source, the electronic device controls its operation power to facilitate charging the battery.

Figure 1:
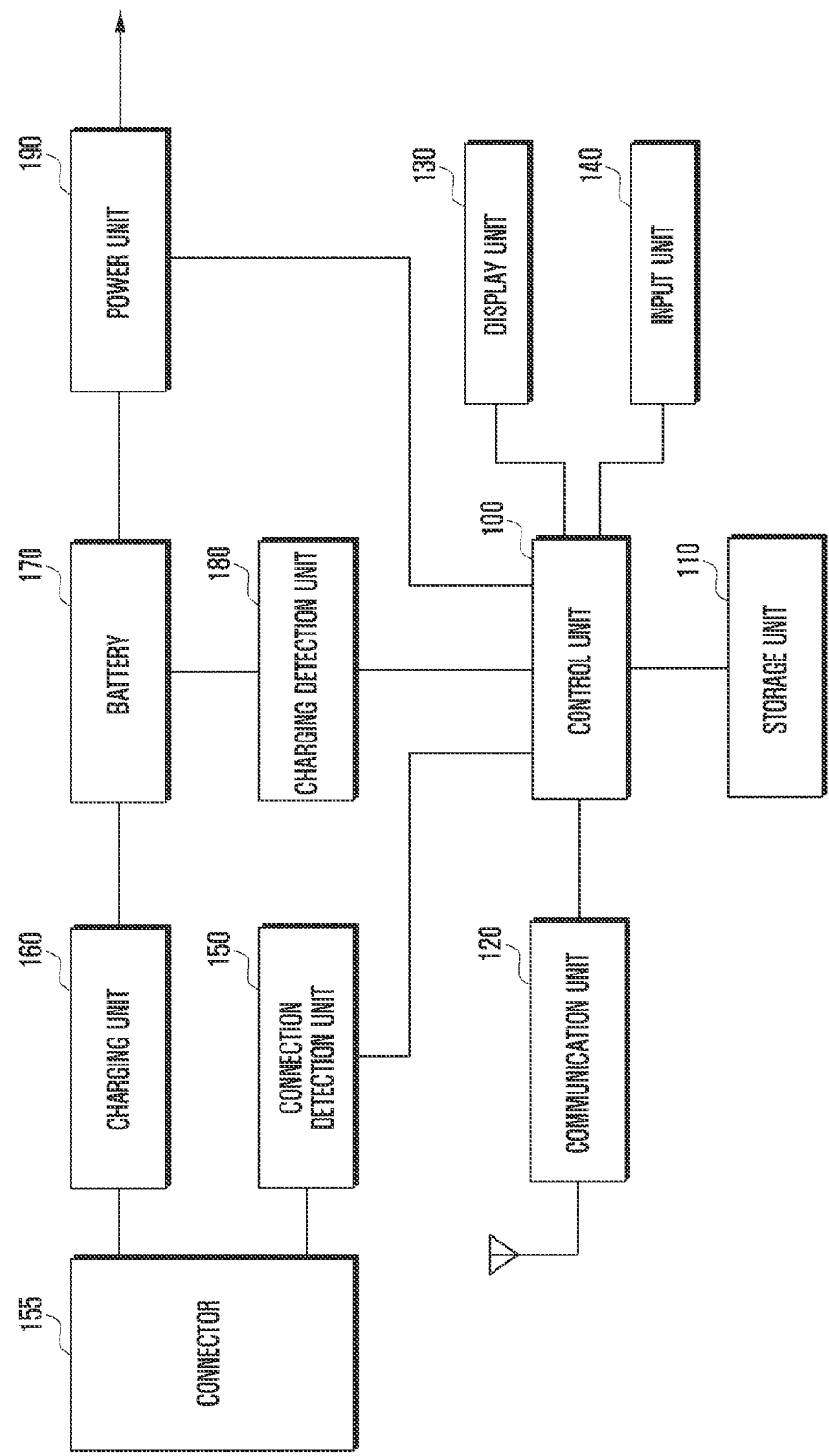
FIG. 1 is a block diagram illustrating a configuration of the electronic device equipped with a battery according to an embodiment of the present disclosure.

FIG. 1 is a block diagram illustrating a configuration of the electronic device equipped with a battery according to an embodiment of the present disclosure.

Referring to FIG. 1, a control unit 100 controls the overall operations of the electronic device. A storage unit 110 includes a program memory for storing an Operating System (OS) of the electronic device and application programs and a data memory for storing data generated by the application programs.

A communication unit 120 is responsible for radio communication with a base station or an Internet server. The communication unit 120 may include a transmitter for up-converting a frequency of a transmission signal and amplifying transmission power and a receiver for low noise amplifying the power of a received signal and down-converting the frequency of the received signal. The communication unit 120 may include (not shown) a modulator and a demodulator. Here, the modulator modulates the transmission signal and sends the modulated signal to the transmitter, and the demodulator demodulates the signal received by the receiver. The modulator/demodulator may support at least one of Long Term Evolution (LTE), Wideband Code Division Multiple Access (WCDMA), Global System for Mobile Communications (GSM), WiFi, Worldwide Interoperability for Microwave Access (WiMAX), Near Field Communication (NFC), and BLUETOOTH. In an embodiment of the present disclosure, it is assumed that the communication unit 120 includes LTE, WiFi, BLUETOOTH, and NFC communication modules.

A display unit 130 displays images captured under the control of the control unit 100. The display unit 130 may be implemented with a Liquid Crystal Display (LCD) or an Organic Light Emitting Diode (OLED). An input unit 140 generates input signals of the electronic device. The input unit 140 may include a finger touch detection panel capable of detecting contact or proximity of finger and a pen touch detection panel capable of detecting contact and proximity (e.g., hovering) of a pen. Here, the finger touch detection panel may be a capacitive type touch panel, and the pen touch panel may be a capacitive type panel or Electromagnetic Resonance sensor pad. The input unit 140 detects a touch and/or hovering gesture to generate an input signal to the control unit 100. The display unit 130 and the input unit 140 may be integrated into a touchscreen.

A battery 170 supplies operation power of the electronic device. A connector 155 connects the electronic device to an external power source. The connector 155 may be connected to various types of chargers. The chargers may include a dedicated power adaptor or terminal adaptor, Universal Serial Bus (USB) type adaptor, and cigar jack (e.g., a car cigarette lighter or 12 v power outlet) type adaptor types. Here, the power adaptor type charger is a dedicated charger of the device capable of charging the battery with satiable charging current. The USB and Cigar jack type chargers may charge the battery with insatiable charging current so as to elongate the battery charging time.

A connection detection unit 150 detects the type of the charger connected through the connector 155 and generates a charger type signal to the control unit 100. The charger may be any of the dedicated power adaptor charger, USB charger, cigar jack charger, and wireless charger. If the connector 155 is connected to the charger, a charging unit 160 converts the external power to the charging power and supplies the charging power to the battery 170. Here, the charging power may be the power of rated current of the battery 170.

A power unit 190 converts the power charged in the battery 170 to operation powers of the components of the electronic device. The power unit 190 may include a buck, a booster, a buck-booster, and a Low Drop Out (LDO) regulator for supplying the operation powers of the components at various levels. A charging detection unit 180 detects the charging power and discharging power of the battery 170. The information on the charging power detected by the charging detection unit 180 may include the charging power (electric current and/or voltage), discharging power (electric current and/or voltage), charged capacity (%) of the battery 170, and temperature of the battery 170. The power unit 190 and the charging detection unit 180 may be implemented as a single integrated circuit or as independent components. In the case of being implemented as the integrated circuit, the power unit 190 and charging detection unit 180 may be a Poser Management Integrated Circuit (PMIC) having a fuel gauge circuit substituting the charging detection unit 180.

The control unit 100 of the electronic device configured as described above is capable of checking a charging speed of the battery 170 by means of the charging detection unit 180 while charging progresses. The control unit 100 may analyze the output power of the charging detection unit 180 to determine the charging state of the battery 170, and controls to supply the operation powers of the respective components of the electronic device. That is, the control unit 100 compares the charging power and the discharging power of the battery 170 and, if the discharging power is greater than the charging power, controls the power unit 190 to restrict the power supply according to predetermined priorities of the components. This means that if the residual battery capacity decreases even while the device is connected to the charger the Auto Power Management function of the control unit 100 controls such that the battery charging power does not drop.

Figure 2:
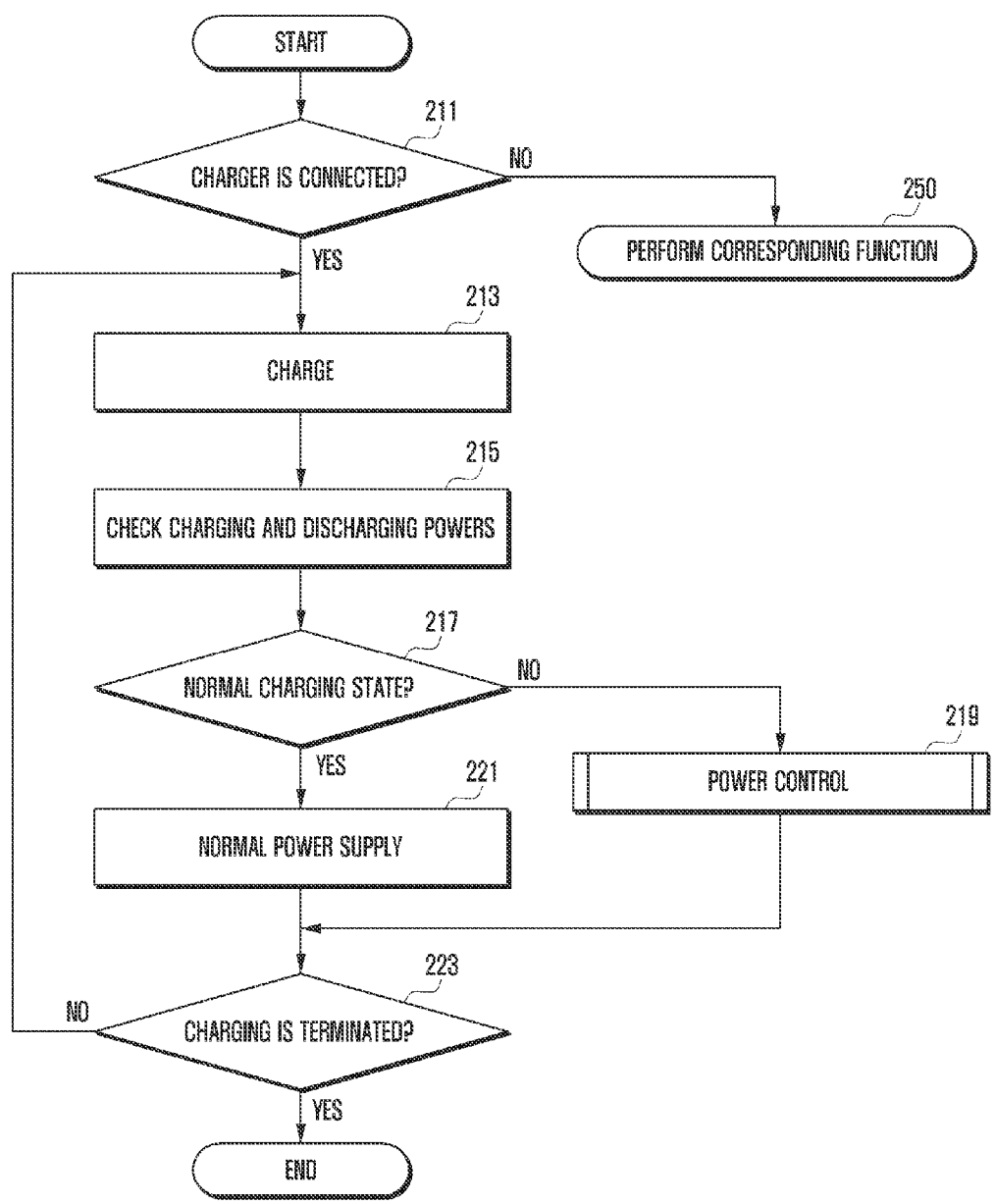
FIG. 2 is a flowchart illustrating a battery charging control procedure of the electronic device according to an embodiment of the present disclosure.

FIG. 2 is a flowchart illustrating a battery charging control procedure of the electronic device according to an embodiment of the present disclosure.

Referring to FIG. 2, the control unit 100 monitors to detect an event and, if the event is detected, determines whether the event is the connection of the charger at operation 211. If the event is not the charger connection event, the control unit 100 controls to perform a function corresponding to the detected event at operation 250. If the event is the charger connection event, i.e., if the connector 155 is connected to the charger (power source), the control unit 100 detects this by means of the connection detection unit 150 and controls the electronic device to operate in a battery charging mode at operation 213. In the charging mode, the control unit 100 analyzes the charging information output from the charging detection unit 180 at operation 215. The charging information from the charging detection unit 180 may include charging power, discharging power, battery charging state, and battery temperature.

Then the control unit 100 compares the charging power and the discharging power to determine whether the battery is charged normally at operation 217. Meanwhile, the user may execute various applications in the state of charging the battery 170. For example, the user may execute a navigation and/or music playback application in the state of charging the electronic device through a car cigar jack. In this case, the discharging power may be greater than the charging power due to the applications currently running on the electronic device.

If it is determined that the battery 170 is charging abnormally (e.g., if the discharging power is greater than the charging power), the control unit controls the power unit 190 to restrict power supply at operation 219. At this time, the power supply may be controlled in various ways depending on the charged state of the battery.

Accordingly, the battery 170 is charged normally under the control of the control unit 100. If the battery 170 is charged normally, the control unit 100 detects this at operation 217 and controls the power unit 190 to supply operation power to the components as usual at operation 221. At operation 223 it is checked whether the charging operation is terminated; if the charging operation is terminated, the process concludes, and if the charging operation is not terminated, then the process returns to operation 213.

Figure 3:
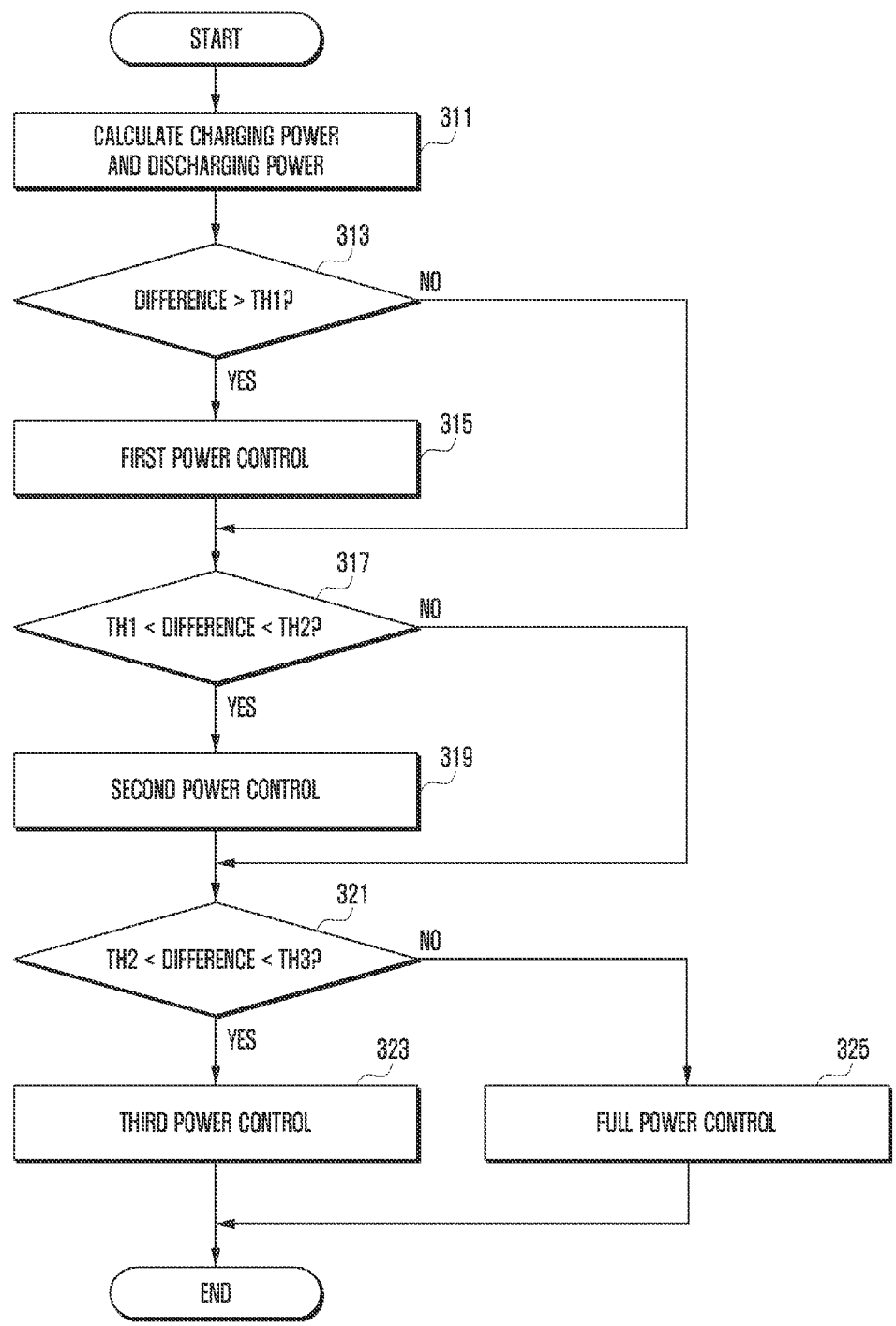
FIG. 3 is a flowchart illustrating a power supply control procedure of the electronic device in the charging mode according to an embodiment of the present disclosure.

FIG. 3 is a flowchart illustrating a power supply control procedure of the electronic device in the charging mode according to an embodiment of the present disclosure. FIG. 3 is directed to a case where the power supply is controlled according to the difference between the charging power and the discharging power in a stepwise manner with 4 levels.

Referring to FIG. 3, the charging speed of the battery 170 may be determined according to a difference between the charging power and the discharging power. That is, if the discharging power is zero or very low while the charging power is higher, the charging speed is fast; if the charging power and the discharging power are similar to each other, the charging speed is slow; and if the charging power is less than the discharging power, the discharging speed increases. In the case that the charging speed is slow or discharging occurs in the charging mode, it is necessary to reduce the discharging power to increase the charging speed. The control unit 100 first checks the charging power and the discharging power of the battery 170 at operation 311. The difference may be the difference value in the case that the discharging power is greater than the charging power. Threshold values Th1 to Th3 have a relationship of Th3>Th2>Th1. If the difference is less than Th1, the control unit 100 detects this at operation 313, and performs the first level power control at operation 315; if the difference is in the range between Th1 and Th2, the control unit 100 detects this at operation 317 and performs the second level power control at operation 319; if the difference is in the range between Th2 and Th3, the control unit 100 detects this at operation 321 and performs the third level power control at operation 323; and if the difference is greater than Th3, detects and controls the power supplied for the applications with low priorities among the currently running applications at operation 325.

At this time, the power control may be performed in a stepwise manner operation of the first to third level power controls. The first level power control may include adjusting a brightness of the display unit 130, the second level power control may include adjusting a clock (CPU clock/ and/or number of active CPU cores in the case of multi-core system), and the third level power control may include adjusting a frame rate of the display unit 130 (adjusting a Graphics Processing Unit (GPU) clock and/or a frames per second rate). The stepwise power control is performed in such a way of minimizing the power consumption while the executed applications are running normally. For example, it is possible to save power considerably by adjusting the brightness of the display unit (for example, an LCD backlight control) that is consuming a large amount of power without influence to the operation of the running applications. If the difference is less than Th1, the control unit 130 controls the power supply to the display unit to adjust the brightness of the screen at operation 315, if the difference is in the range between Th1 and Th2, the control unit 100 controls the operation powers of the display unit 130 and the control unit 100 at operation 319 to adjust the brightness of the screen and the clock speed (and/or a number of active CPU cores), and if the difference is in the range between Th3 and Th4, the control unit 100 controls the operation powers of the display unit 130 and the control unit 100 to adjust the screen brightness, clock speed, and frame rate of the screen.

By controlling the power unit 190 to adjust the operation powers supplied to the components as described in the embodiment of FIG. 3, it is possible to guarantee that the charging power is greater than the discharging power in the battery. Accordingly, the battery 170 is charged normally under the control of the control unit 100. If the battery 170 is charged normally, the control unit 100 detects this at operation 217 and controls the power unit 190 to supply operation power to the components as usual at operation 221.

The above described power control procedure is repeated until the charging completes. If the connector 115 is disconnected from the charger, the control unit 100 detects the disconnection by means of the connection detection unit 150 and ends the charging mode.

Figure 4:
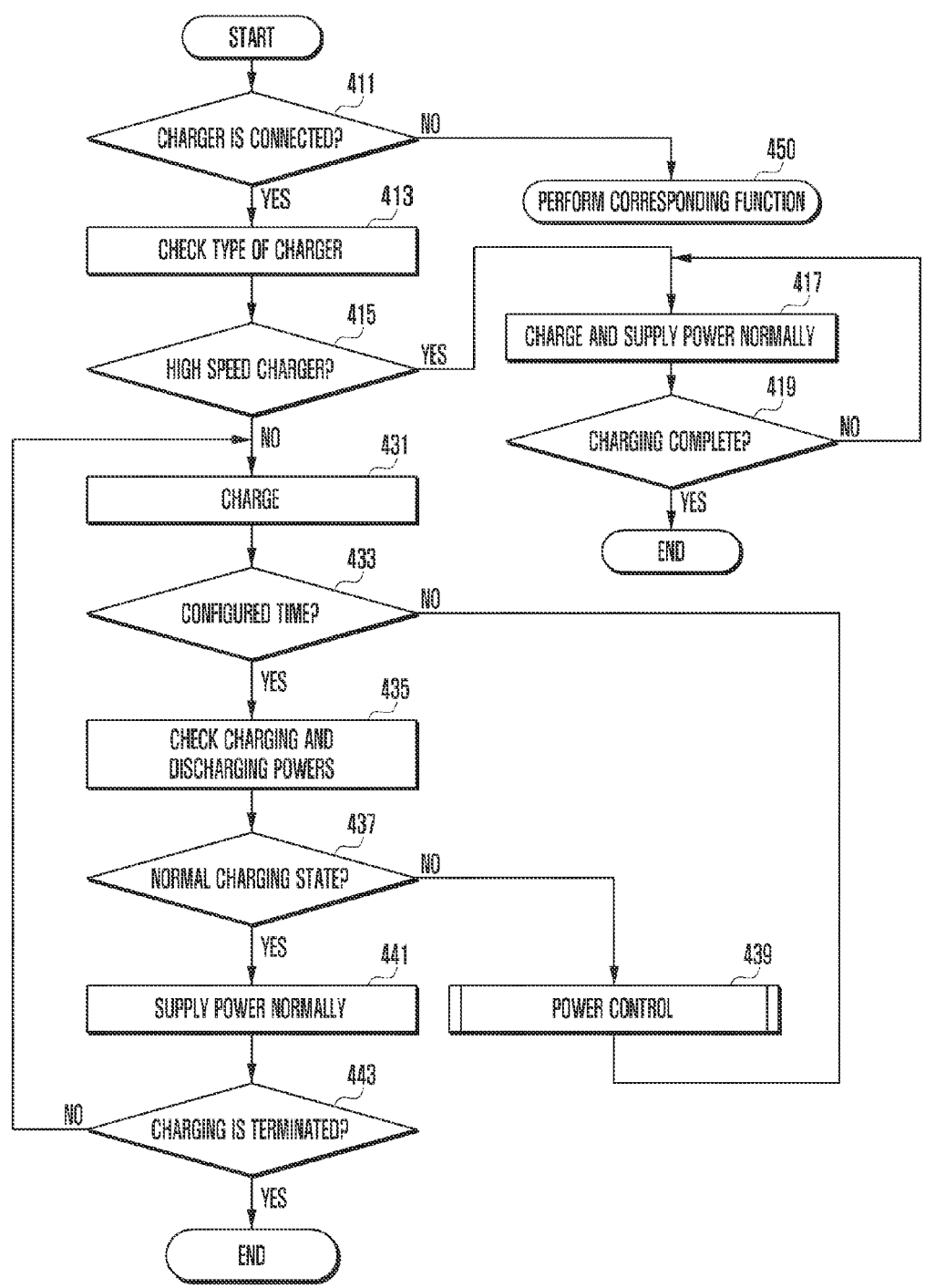
FIG. 4 is a flowchart illustrating the power charging control method of the electronic device according to an embodiment of the present disclosure.

FIG. 4 is a flowchart illustrating a power charging control method of the electronic device according to an embodiment of the present disclosure.

Referring to FIG. 4, if the charger is connected to the connector 115, the connection detection unit 150 detects the connection of the charger and generates a signal to the control unit 100. Then the control unit 100 is aware of the connection of the charger to the electronic device at operation 411 and analyzes the output of the connection detection unit 150 at operation 413 to determine the type of the connection charger at operation 415. If the event is not the charger attach event, the control unit 100 executes a function corresponding to the event at operation 450. The charger may be one of the dedicated power adaptor charger of the electronic device, USB type charger, cigar jack type charger, or wireless charger. The dedicated power adaptor charger is a high speed charger capable of supplying the charging current high enough. The USB and cigar jack type chargers may be implemented so as to supply the charging current high enough for charging the battery fast. Accordingly, the control unit 100 analyzes the charging capacity of the connected charger at operation 413 and determines whether the charger is a high speed type of charger at operation 415. If it is determined at operation 415 that the connected charger is the high speed charger, the control unit 100 controls such that the charging current is supplied to the battery 170 and the power unit 190 supplies the operation power normally at operation 417. In the high speed charging mode, it is possible to supply the charging current high enough such that the charging power is greater than the discharging power. Accordingly, if a high speed charger is connected, the control unit 100 controls such that the normal operation power is supplied in the charging mode at operation 417 until the high speed charger is detached. If the high speed charger is detached, it is determined at operation 419 that the charging is complete.

If it is determined that the connected charger is not a high speed type of charger at operation 415, the control unit 100 detects this by means of the connection detection unit 150 and performs the charging mode at operation 431. In the charging mode, the charging unit 160 supplies the charging power to the battery 170 and the power unit 190 converts the power to the operation powers of the respective components of the electronic device. At this time, the charger connected to the connector 155 may be a charger relatively slow in charging the battery 170. In this case, the charging power output by the charging unit 160 may be supplied at a relatively low level. Accordingly, in the case that a low speed charger is connected, the discharging power level of the battery 170 may be higher than the charging power level, depending on the applications running on the electronic device. For example, if the USB or cigar jack type charger is connected to the connector 155 and the control unit 100 executes at least one application including the navigation application, the charging power of the battery may become equal to or less than the discharging power. In this case, although the charger is detached from the connector 155 after a long charging duration, the battery 170 may not be as charged as expected.

In the state that a low speed charger is connected, if a predetermined time elapses in the charging mode, the control unit 100 detects this at operation 433 and reads the charging and discharging powers of the battery, a battery charging level and/or a charging temperature to analyze the charging state of the battery 170. The charging state analysis is performed by calculating the difference between the charging and discharging powers of the battery 170 and determines whether the difference is in the normal charging range. At this time, if the difference is out of the normal charging range, the control unit 100 detects this at operation 437 and performs the power control mode for restricting supply of operation power in the charging state at operation 439. Here, if the difference value is out of the normal charging range, the charging power may be equal to or less than a predetermined threshold although it is greater than the discharging power. This means that the charging power is higher than the discharging power but not enough to charge the battery 170 satisfactorily. For example, if the charging power is not over 30% higher than the discharging power, it can be considered that the difference is out of the normal charging range. If the charging current is 500 mA and the discharging current is equal to or greater than 350 mA, this may be determined as an abnormal charging state.

In the abnormal charging state, the control unit 100 detects the abnormal discharging state at operation 437 and controls the power unit 190 to restrict the supply of the operation power at operation 439. The operation power supply may be controlled in such a way of comparing with at least one threshold value to control the supply of the operation power in a stepwise manner depending on the charging power level. At this time, the operation power supply may be controlled in such a way of reducing the power consumptions in an order of priority while minimizing the influence to the operations of the currently running applications. That is, the power supply is controlled in the order of adjusting the brightness of the display unit 130 which consumes a large amount of power first, adjusting the clock speed, and then the Frames Per Second (FPS) rate of the screen. Otherwise if the difference between the charging power and the discharging power is in the normal range, the control unit 100 detects this at operation 437 and controls the power unit 190 to supply the operation powers for the applications at operation 441.

Although not shown in FIG. 4, if the charged power capacity of the battery is equal to or greater than a predetermined level, the charging state may be determined as the normal charging state independently of the difference between the charging power and the discharging power. For example, if the charged power capacity of the battery 170 is equal to or greater than a predetermined amount (e.g., if the residual capacity of the battery 170 is equal to or greater than 70% of the full battery capacity), the normal power control is mainlined. That is, if the charged power capacity of the battery 170 is equal to or greater than a predetermined amount, the control unit 100 controls to perform the normal operation power supply even when the charging power is equal to or less than the discharging power.

The above-described power charging procedure is performed repeatedly and, if the charger is detached from the connector 155 at operation 443, the control unit 100 ends the charging procedure.

Figure 5:
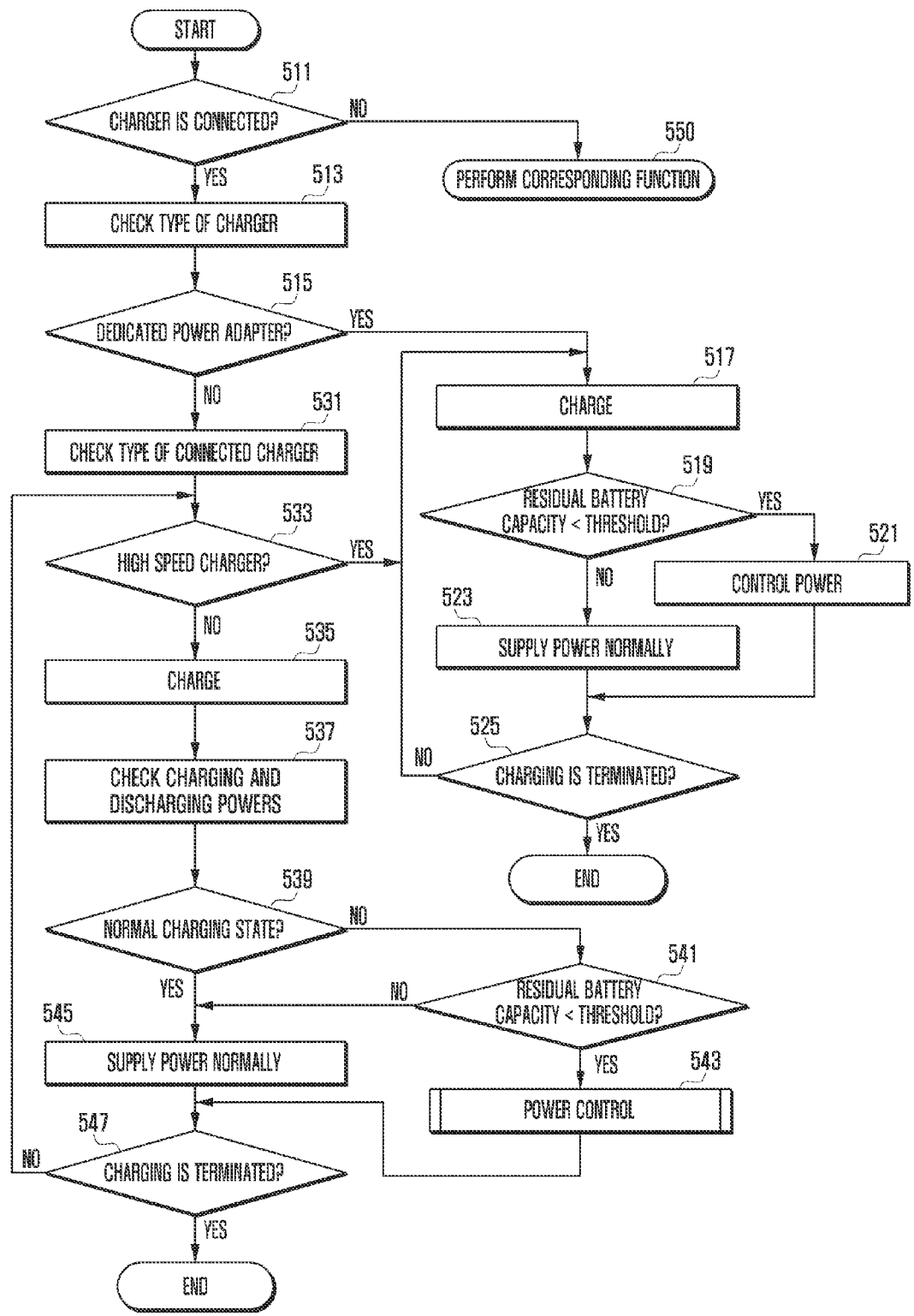
FIG. 5 is a flowchart illustrating the charging procedure of the electronic device according to an embodiment of the present disclosure.

FIG. 5 is a flowchart illustrating the charging procedure of the electronic device according to an embodiment of the present disclosure.

Referring to FIG. 5, the control unit 100 monitors to detect an event and, if an event is detected, determines whether the event is a charger connection event at operation 511. If the event is not the charger attach event, the control unit 100 executes a function corresponding to the event at operation 550. At this time, the electronic device operates with the power supplied by the power unit 190. If it is determined at operation 511 that the event is the charger connection event, the control unit 100 analyzes the output of the connection detection unit 150 to determine whether the connected charger is the dedicated charger at operation 513.

The charger may be one of a dedicated terminal adaptor charger, a USB type charger, a cigar jack type charger, and a wireless type charger.

In the case that the dedicated charger is connected, it is possible to charge the battery with the charging power. Accordingly, if it is determined that the connected charger is the dedicated charger, the control unit 100 controls to charge the battery at operation 517. Next, the control unit 100 determines whether the residual capacity of the battery 170 is less than a predetermined threshold at operation 519. At this time, the residual battery capacity of the battery 170 may be less than the threshold at the initial stage. If the residual capacity of the battery 170 is less than the threshold, the control unit 100 controls the power unit 190 to adjust the operation powers supplied to the individual components of the electronic device at operation 521. At operation 521, the operation power supply may be performed as described with reference to FIG. 3. If the connected charger is the dedicated charger, the power supplied from the charging unit 160 to the battery 170 is high enough to charge the battery such that the residual battery capacity is likely to become equal to or greater than a predetermined percentage. If it is determined that the residual battery capacity is equal to or greater than the threshold at operation 519, the control unit 100 controls the power unit 190 to perform the normal power supply procedure at operation 523. In the case that the dedicated charger is connected, if the residual battery capacity becomes equal to or greater than a predetermined level, the charging unit 160 supplies the charging power high enough and the control unit 100 detects this by means of the charging detection unit 180 at operation 519 and performs the charging and operating power supply normally at operation 523. If the user detaches the charger from the connector 155 in the state of charging the battery, the control unit 100 detects this at operation 525 and ends the charging procedure.

If it is determined that the connected charger is not the dedicated charger at operation 515, the control unit 100 analyzes the type of the connected charger at operation 531. At this time, the connected charger may be one of a USB type charger, a cigar jack type charger, and a wireless type charger supporting low speed charging or high speed charging function. For example, the cigar jack type charger may support the high speed charging function like the dedicated charger, or a relatively low speed charging function as compared to the dedicated charger. When a charger is connected to the connector 155, the connection detection unit 150 checks the type of the charger and notifies the control unit 100 of the type of the charger such that the control unit 100 acquires the type and charging capacity of the connected charger (i.e., high speed charger or low speed charger) based on the type information. If it is determined at operation 533 that the connected charger is the high speed charger, the procedure goes to operation 517 in which the control unit 100 controls the charging operation in the same way as the dedicated charger.

If it is determined at operation 533 that the connected charger is one of the USB, cigar jack, or wireless type charger having the low speed charging capacity, the control unit 100 controls to perform the charging mode at operation 535. In the charging mode, the battery 170 is charged according to the output of the charging unit 160 and discharges the power charged in the power unit 190. The charging detection unit 180 checks the charging state of the battery 170. The control unit 100 receives the charging information through the charging detection unit 180 and analyzes the difference between the charging power and the discharging power at operation 537. Here, the charging information may include charging power, discharging power, and charging state and charging temperature of the battery 170. If the result of the comparison between the charging and discharging powers indicates at operation 539 that the charging state is abnormal, the control unit 100 determines whether the residual battery capacity is less than a predetermined percentage at operation 541. If it is determined at operation 541 that the residual battery capacity is less than the predetermined percentage, the control unit 100 controls the power unit 190 to restrict the operation power supply according to the difference between the charging and discharging powers at operation 543. At this time, the power control is performed as described with reference to FIG. 3.

Otherwise if the result of comparison between the charging and discharging powers indicates that the charging state is normal at operation 539 or if it is determined that the residual battery capacity is equal to or greater than the predetermined threshold at operation 541, the control unit 100 controls the power unit 190 at operation 545 to supply the operation powers normally according to the running applications.

If it is detected that the charger is detached from the connector 155 at operation 547, the control unit 100 ends the charging mode.

In the case that the battery-powered electronic device operates in the charging mode, the control unit 100 checks the residual capacity of the battery 170 in the state of being charged through the charging detection unit 180 and controls the power unit 190 to charge the battery 170 stably. At this time, the charging power may be the electric current. The control unit 100 analyzes the charging information output by the charging detection unit 180 to measure the total current (total amperage) charged in the battery 170 per period (predetermined time duration). If electric current charged in the battery 170 decreases even in the state that the charger is connected, the control unit 100 performs the power control to prevent the charging current from dropping below a predetermined level.

If the current being charged in the battery 170 is influenced by the discharging current, i.e., if abnormal charging occurs, the control unit 100 controls the power unit 190 to restrict the operation power supply. At this time, the operation power supply control may be performed in a way of avoiding influencing the currently running application as much as possible. Suppose that the electronic device is a mobile terminal equipped with a quad-core processor and operates at a maximum CPU clock of 1.5 GHz and a maximum GPU clock of 1 GHz. In this case, the power control may be performed with the items listed in Table 1. The power control method may be performed as arranged in Table 2.

TABLE 1

| | Item | Power control scheme |
|---|---|---|
| 1 | Adjust brightness of LCD Backlight | Darken |
| 2 | Adjust number of CPU Max Cores | Quad → Dual, Dual → Single |
| 3 | Adjust CPU Max Clock | 1.5 GHz → 800 MHz |
| 4 | Adjust LCD Frame Rate | 60 fps(frame per second) → 30 fps |
| 5 | Adjust GPU Max Clock | 1 GHz → 600 MHz |

TABLE 2

| Step | Charging state detection | Power control |
|---|---|---|
| 1 | Difference < Th1 | Control item 1 |
| 2 | Th1 < Difference < Th2 | Control items 1 + 2 |
| 3 | Th2 < Difference < Th3 | Control items 1 + 2 + 3 |
| 4 | Th3 < Difference < Th4 | Control items 1 + 2 + 3 + 4 |
| 5 | Difference > Th4 | Control items 1 + 2 + 3 + 4 + 5 |

As described above, the battery charging apparatus and method of the present disclosure is capable of comparing the charging power and discharging power in the state of charging the battery of the electronic device to stabilize charging the battery by controlling the power supply to the electronic device. Also, the battery charging apparatus and method of the present disclosure is capable of controlling the power supply to the electronic device depending on the charging type in the state of charging the battery so as to facilitate charging the battery.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of charging an electronic device, the method comprising:
   detecting a connection of a charger;
   checking a charging power and a discharging power of a battery while charging the battery with an output of the charger;
   determining whether the electronic device is in a normal charging state according to a difference between the charging power and the discharging power;
   restricting, when the electronic device is in an abnormal charging state, a supply of operation power from the battery; and
   supplying, when the electronic device is in the normal charging state, the operation power from the battery.

2. The method of claim 1, wherein the determining whether the electronic device is in the normal charging state comprises:
   analyzing the difference; and
   determining, when the charging power is less than the discharging power, that the electronic device is in the abnormal charging state.

3. The method of claim 2, wherein the charging power and the discharging power are measured electric currents.

4. The method of claim 2, wherein the restricting the supply of operation power comprises:
   configuring items for controlling the supply of the operation power based on a plurality of reference values; and
   restricting the supply of the operation power for an item determined by comparing the difference with the plurality of reference values when the electronic device is in the abnormal charging state.

5. The method of claim 4, wherein the items comprise at least one of a screen brightness adjustment, a system clock adjustment, and a screen frame rate adjustment.

6. The method of claim 4, further comprising:
   checking a type of the charger, which is connected with a connector; and
   if the type is a high speed type charger, supplying the operation power from the battery without determining whether the electronic device is in the normal charging state.

7. The method of claim 4, further comprising:
   checking, when the connection of the charger is detected, a type of the charger; and
   performing, when the type of the charger is not a high speed type, the determination on whether the electronic device is in the normal charging state.

8. The method of claim 7, wherein the type of the charger comprises one of a Universal Serial Bus (USB) type, a cigar jack type, and a wireless type.

9. A method of charging an electronic device, the method comprising:
   charging, when a charger is connected, a battery with an output of the charger;
   checking, when the connected charger comprises one of a Universal Serial Bus (USB) type, a cigar jack type, and a wireless type charger, a charging power and a discharging power of the battery;
   calculating a difference between the charging power and the discharging power;
   determining whether the electronic device is in an abnormal charging state according to the difference;
   checking, when the electronic device is in the abnormal charging state, a residual capacity of the battery;
   restricting, when the residual capacity of the battery is equal to or less than a threshold value, a supply of operation power from the battery; and
   supplying, when the electronic device is in the abnormal charging state, the restricted supply of the operation power from the battery.

10. The method of claim 9, further comprising:
    when the connected charger comprises a dedicated charger, supplying the operation power from the battery without regard to whether the electronic device is in the abnormal charging state.

11. The method of claim 10, wherein the determining of whether the electronic device is in the abnormal charging state comprises:
    analyzing the difference;
    determining, when the charging power is less than the discharging power, that the electronic device is in the abnormal charging state.

12. The method of claim 11, wherein the restricting of the supply of the operation power comprises:
    configuring items for controlling the supply of the operation power based on one or more reference values; and
    restricting the supply of the operation power for an item determined by comparing the difference with the reference values when the electronic device is in the abnormal charging state.

13. The method of claim 12, wherein the items comprise at least one of screen brightness adjustment, a system clock adjustment, and a screen frame rate adjustment.

14. An electronic device comprising:
    a battery;
    a connector to which a charger is connected;
    a charging unit configured to generate a charging power to the battery when the charger is connected to the connector;
    a power unit configured to supply power of the battery as operation power;
    a connection detection unit configured to detect a connection of the charger to the connector;
    a charging detection unit configured to check a charging power and a discharging power of the battery; and
    a control unit configured to:

control the charging unit and the power unit to adjust the charging power and the discharging power of the battery in detection of the connection of the charger, analyze a charging state of the battery according to a difference between the charging power and the discharging power, and control, when the battery is in an abnormal charging state, the power unit to restrict a supply of the operation power.

15. The electronic device of claim 14, wherein the connection detection unit is further configured to detect a type of the connected charger, and wherein the control unit is further configured to check the charging state of the battery by analyzing an output of the charging detection unit when a charger detection signal indicating that the type of the connected charger comprises one of a Universal Serial Bus (USB) type, a cigar jack type, and a wireless type is received.

16. The electronic device of claim 15, wherein the control unit is further configured to control, when a detection signal indicating a connection of a dedicated charger is received from the connection detection unit, the power unit to supply the operation power from the battery.

17. The electronic device of claim 16, wherein the control unit is further configured to:

calculate the difference between the charging power and the discharging power, and determine, when the charging power is less than the discharging power, that the battery is in the abnormal charging state.

18. The electronic device of claim 17, wherein the charging power and the discharging power comprise electric currents.

19. The electronic device of claim 16, wherein the control unit is further configured to:

configure items for controlling the supply of the operation power based on a plurality of reference values, and restrict the supply of the operation power for an item determined by comparing the difference with the reference values when the battery is in the abnormal charging state.

20. The electronic device of claim 19, wherein the control unit is further configured to control the power unit to adjust a screen brightness adjustment, a system clock adjustment, and a screen frame rate adjustment for restricting the supply of the operation power.

* * * * *